United States Patent [19]
Oswald et al.

[11] 3,737,783
[45] June 5, 1973

[54] SIGNAL-TO-NOISE RATIO IMPROVING DEVICE FOR RECEIVING SYSTEMS HAVING TWO WAVE COLLECTORS

[75] Inventors: Jacques Oswald, Versailles; Yves Rainsard, Antony, both of France

[73] Assignee: Compagnie Industrielle Des Telecommunications, Paris, France

[22] Filed: May 14, 1971

[21] Appl. No.: 143,337

[30] Foreign Application Priority Data

May 15, 1970 France..................................7017868

[52] U.S. Cl. ..................325/367, 325/304, 325/371, 325/474, 325/475, 325/476, 328/169, 329/145
[51] Int. Cl.................................................H04b 1/12
[58] Field of Search .................324/776, 77 H, 77 R; 325/324, 301, 304, 305, 367, 371, 372, 387, 474–476; 328/169, 173; 329/145

[56] References Cited

UNITED STATES PATENTS

| | | | |
|---|---|---|---|
| 3,634,760 | 1/1972 | Murtin | 324/77 R |
| 2,553,271 | 5/1951 | Peterson | 325/304 |
| 2,813,974 | 11/1957 | Keall | 325/474 |

*Primary Examiner*—Albert J. Mayer
*Attorney*—Craig, Antonelli & Hill

[57] ABSTRACT

A signal-to-noise ratio improving device for processing narrow frequency band signals received by two wave collectors (transducers or antennas) and respectively delivered at one and the other of two input terminals in the form of identical useful signals on each of which a different quasi-stationary noise is superposed. The device forms the sum and difference of the noise-affected signals received at said input terminals and the said difference is processed in a circuit comprising amplitude regulating means, first and second correlators each having two inputs to one of which is fed the said sum and to the other of which are applied, for said first correlator, said amplitude-regulated difference and, for said second correlator, the latter said difference delayed by a fixed time interval. The correlators deliver at their respective outputs signals proportional to the time average of the product of the signals applied to their two inputs. The averaged signals are respectively applied to a first input of each one of two multipliers, to a second input of which are respectively applied said amplitude-regulated difference and said delayed amplitude-regulated difference. The outputs of the multipliers deliver new signals which are applied to the inputs of an adder, and the output signal from said adder is applied to an input of a subtractor, to the other input of which said sum of noise-affected signals is applied. The output of the subtractor delivers the improved signal.

9 Claims, 4 Drawing Figures

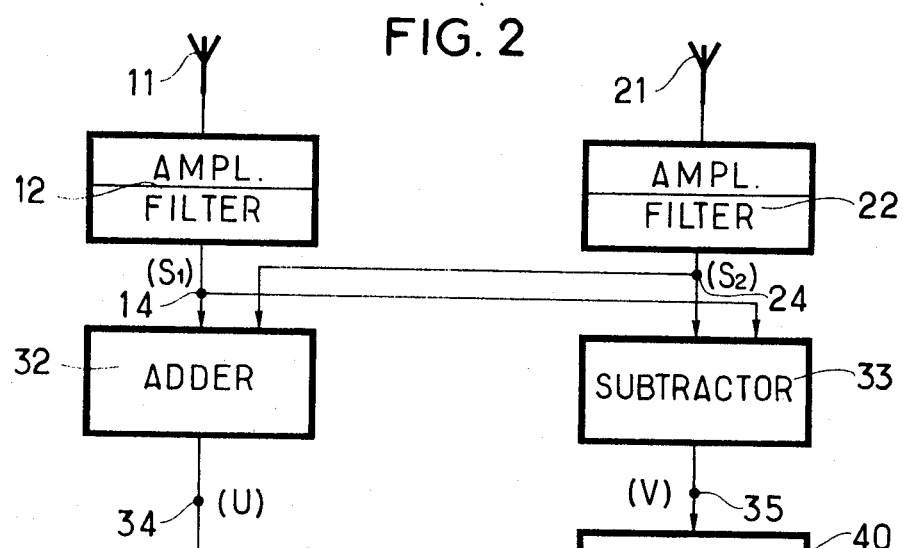
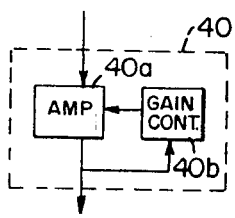
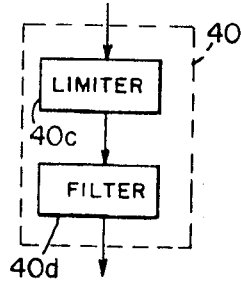
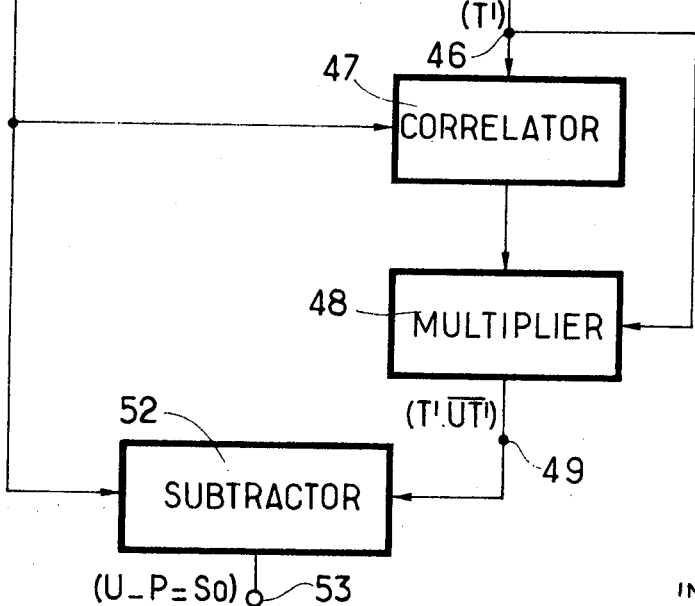

SIGNAL-TO-NOISE RATIO IMPROVING DEVICE FOR RECEIVING SYSTEMS HAVING TWO WAVE COLLECTORS

The present invention concerns apparatus for improving the signal-to-noise ratio of a signal.

The invention is particularly, but not exclusively, applicable to equipment for picking up periodic sinusoidal signals of known frequency using a pair of transducers. These transducers may be radio aerials in the case of picking up radio transmissions, electro-acoustic transducers in the case of underwater acoustic signals (sonar), or such other forms of transducer as may be required for a particular application.

For the sake of convenience, the remainder of this specification will refer to aerials, but it will be appreciated that these other forms of transducer are included in the description.

By way of example, it will be supposed that two signals received on respective aerials both have a constant frequency $f_o$, possibly with a fairly slow amplitude modulation so that the total bandwidth involved is low in relation to the frequency value $f_o$.

It is further supposed that the two signals, before being treated for reducing their signal-to-noise ratio, will be amplified and filtered so as to have the same instantaneous amplitude S (t). They will also be given the same phase.

If the instantaneous values of the two signals as applied to respective inputs of apparatus for reducing the signal-to-noise ratio are $S_1(t)$ and $S_2(t)$, these may be written:

$S_1(t) = S(t) + b_1(t)$
$S_2(t) = S(t) + b_2(t)$ where $b_1(t)$ and $b_2(t)$ are the respective instantaneous noise levels.

It is further supposed that there is no correlation between S(t) and either noise level, but that there will generally be some correlation between the noise levels themselves. Thus:

mean value of product $(S \cdot b_1) = 0$
mean value of product $(S \cdot b_2) = 0$
mean value of product $(b_1 \cdot b_2) \neq 0$ Improvements in the signal-to-noise ratio in receiving systems with several aerials have been generally described in an article by Henri Mermoz in the French review "Annales des Telecommunications," Vol. 18, 1963, No. 7-8, pages 126-140. Apparatus embodying these principles have been described in French Pat. No. 1,347,229 in the name Henri Mermoz, and deal with the case of two aerials.

The two-aerial case is particularly important in practice, since a system with more than two aerials can be treated as a combination of several sets of two aerials, each pair of which can be treated individually to reduce noise, after which the noise reduced signals can again be grouped in pairs and treated further.

The present invention is intended to provide improved apparatus for improving such signal-to-noise ratios.

In accordance with the invention, there is provided apparatus for improving the signal-to-noise ratio of a received signal, comprising: first and second input terminals connected to receive respective first and second signals $S_1(t)$ and $S_2(t)$ with respective noise levels $b_1(t)$ and $b_2(t)$, the first and second signals being evolved from a common signal $S(t)$ of frequency $f_o = 1/I_o$; addition and subtraction circuitry connected to receive the first and second signals and arranged to form respectively their sum $U = S_1(t) + S_2(t)$ and their difference $V = S_1(t) - S_2(t)$; circuitry for forming the quantities $h'V$ and $h''V(t - T_o/4)$, where:

$h' = (B_2 - B_1) / B_1 + B_2 - 2B_{12})$;
and
$h'' = 2B'_{12} / (B_1 + B_2 - 2B_{12})$;

and further circuitry for forming the sum $U + h'V + h''V(t - T_o/4)$ constituting an output signal $S_o(t)$ with improved signal-to-noise ratio; where $B_1$ and $B_2$ are respectively the mean values of the squares of $b_1(t)$ and $b_2(t)$, $B_{12}$ is the mean value of the product $b_1(t) b_2(t)$, and $B'_{12}$ is the mean value of the product $b_1(t) b_2(t - T_o/4)$.

In the previous proposals, the noise reduction is obtained by treating the signals $S_1$ and $S_2$ defined above separately, in amplitude and in phase. The two signals thus treated are finally combined to provide at a signal output the improved signal $S_o$ required.

Treating the noise levels $b_1$ and $b_2$ as periodic signals of mean frequency $f_o$ (which is legitimate due to the narrow bands of frequencies occupied by these noise levels around frequency $f_o$), the improved signal is formed by the combination:

$$S_o = h1\, S1 + h_2\, S_2 \qquad (1)$$

where the coefficients $h_1$ and $h_2$ are complex coefficients modifying both the amplitude and the phase of signals $S_1$ and $S_2$.

To this end, each signal $S_1$ and $S_2$ is divided into two components with a phase difference of 90 electrical degrees, or more exactly shifted in time by ¼ period $T_o/4$ where $T_o$ is equal to $1/f_o$. This practically equivalent to a de-phasing of 90 electrical degrees because the frequencies concerned are close to $f_o$.

Each of the four components thus obtained must be multiplied by an appropriate numerical coefficient provided by a four calculator and based on the values of $b_1$ and $b_2$. The four signals thus obtained must be finally re-combined, and it will therefore be appreciated that four de-phasing circuits or delay lines, together with four calculators, are required to obtain the improved signal.

The present invention exploits the fact that an equivalent result may be obtained with simplified apparatus in replacing the transformation of equation (1) by the expression:

$$S_o = S_1 + S_2 + h(S_1 - S_2) \qquad (2)$$

This is equivalent to equation (1), to a constant K, provided that:

$1 + h = K\, h_1$
$1 - h = K\, h_2$
$h = h_1 - h_2/h_1 + h_2$

The expression for $h$ may be obtained from the known expressions for $h_1$ and $h_2$ given in the previously mentioned works. It is found that:

$$h = B_2 - B_1/D - j(2B'_{12}/D) \qquad (3)$$

where $B_1$ and $B_2$ are respectively the mean values of the squares of $B_1(t)$ and $B_2(t)$, $B_{12}$ is the mean value of the product $b_1(t) b_2(t)$, $b'_{12}$ is the mean value of the product $b_1(t) b_2(t - T_o/4)$, D is the sum $(B_1 + B_2 - 2B_{12})$ and $B_o$ is the mean value of the square of the noise level of the improved signal.

Equation (3) may be written:

$$h = h' - jh''$$

where:

$h' = (B_2 - B_1) / (B_1 + B_2 - 2B_{12})$ and $h'' = 2B'_{12} / (B_1 + B_2 - 2B_{12})$ Equation (2) may be written:

$$S_o(t) = S_1(t) + S_2(t) + h'(S_1(t) - S_2(t)) + h''(S_1(t-(T_o/4)) - S_2(t-(T_o/4))) \quad (4)$$

Equations (3) and (4) represent directly the operations to be carried out on the sum $(S_1 + S_2)$ and the differents $(S_1 - S_2)$ to obtain the required improved signal $S_o$.

Writing:

$$U = S_1 + S_2$$
$$V = S_1 - S_2 = b_1 - b_2$$

the required signal may be written:

$$S_o(t) = U(t) + h'V(t) + h''V(t - (T_o/4)) \quad (5)$$

The useful signal power in signal $S_o(t)$ is $4S^2$. It can be shown that the noise power is:

$$B_o = 4 B_1 B_2 - B_{12}^2 - B'^2_{12}/D \quad (6)$$

The invention will now be described in more detail, by way of examples only, and with reference to the accompanying diagrammatic drawings, in which:

FIG. 2 is a simplified form of the apparatus; and

FIGS. 3a and 3b show different forms of the amplitude regulator of the apparatus of the present invention in block diagram form.

Figure 1:
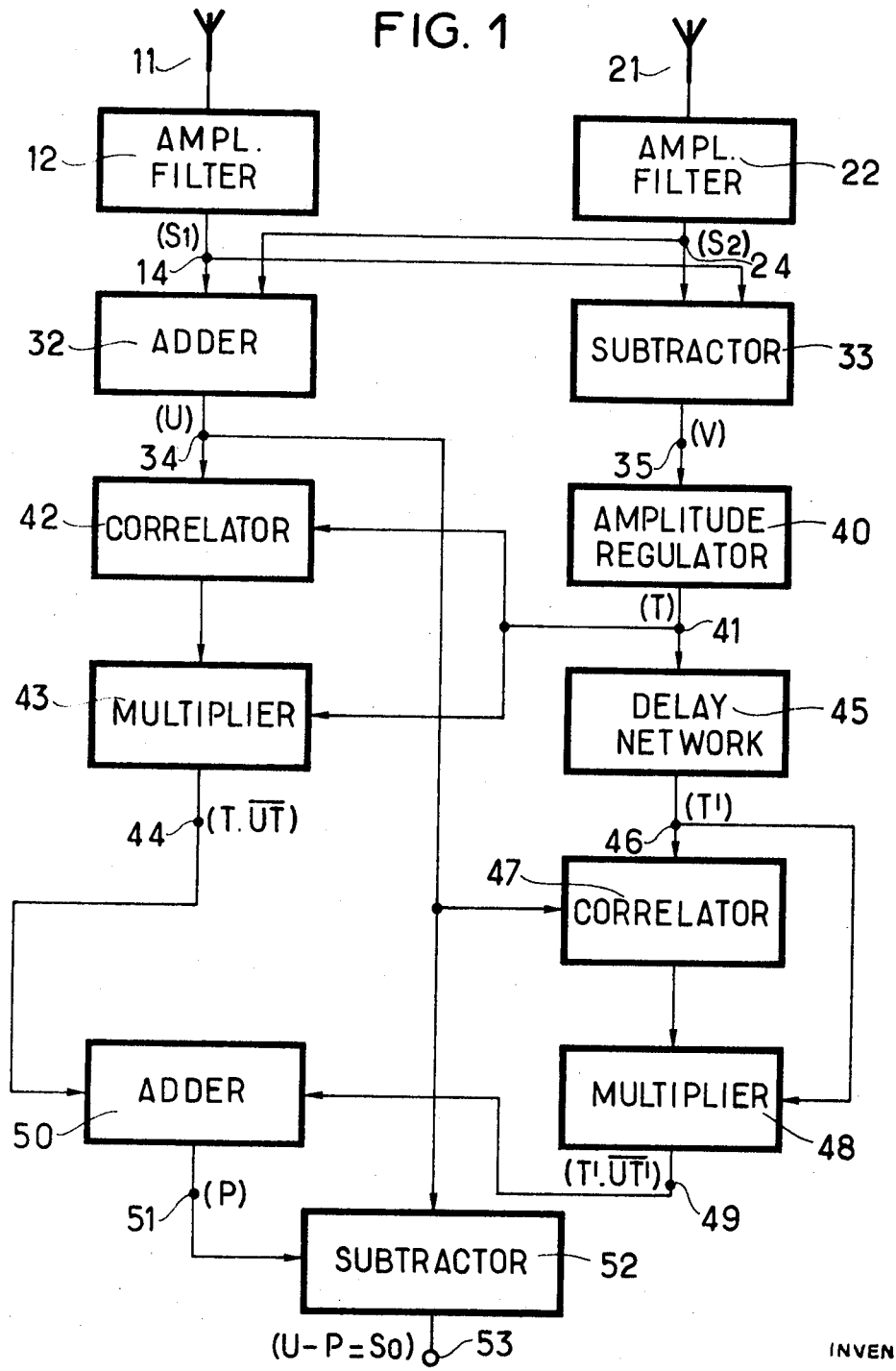
FIG. 1 is one form of apparatus for improving signal-to-noise ratio.

Referring to FIG. 1, aerials 11 and 21 deliver respective signals at frequency $f_o$ to circuits 12 and 22, each including amplifiers and narrow band band-pass filters centered on the frequency $f_o$. By amplifying and filtering the input signals, these circuits 12 and 22 provide at respective outputs 14 and 24 the signals $S_1$ and $S_2$ defined above.

The signals $S_1$ and $S_2$ are applied to respective inputs of an adder 32, and to respective inputs of a subtractor 33.

These provide at respective outputs 34 and 35 the signals $U = S_1 + S_2$ and $V = S_1 - S_2$.

Output 35 is connected to the input of an amplitude regulator 40 which amplifies the signal V by an amount which varies with the mean value of V, so that the mean value of the square of the modulus of V is substantially constant. From the definitions given above, the mean value of $V^2$ equals $B_1 + B_2 - 2B_{12} = D$.

The regulator 40 provides at its output 41 a new signal T of substantially constant effective value $T = AV/\sqrt{D}$ where A is a constant.

The amplitude regulator 40 suitably includes an amplifier 40a with an automatic-gain-control circuit 40b arranged to vary gain in accordance with the mean quadratic value of the amplifier's output signal, obtained through a rectifier as shown in FIG. 3a. Alternatively, as shown in FIG. 3b the amplitude regulator 40 may include an amplitude limiter 40c and a band-pass filter 40d with narrow band centered on the frequency $f_o$ connected to receive the limiter output.

The output 41 of regulator 40 is connected to one of two inputs of a first correlator 42 whose second input is connected to the output 34 of adder 32. The correlator forms the product of the amplitudes of its two input signals and, after either integrating the product with respect to time, or passing it through a low-pass filter, provides at its output a unidirectional voltage whose amplitude is slowly variable and proportional to the mean value of the product. The mean value of U and T is designated $\overline{UV}$, and the unidirectional voltage proportional to this appearing at the output of correlator 42 is applied to one of two inputs of a multiplier 43 whose second input is connected to receive the signal T. At the output 44 of multiplier 43 is obtained the product $T \cdot \overline{UT}$.

As there is now correlation between signal S and noise levels $B_1$ and $B_2$, a simple calculation shows that the instantaneous amplitude of the signal at output 44 is:

$$-h'(b_1 - b_2) = -h'V$$

The output 41 of regulator 40 is connected to the input of a delay circuit 45 which delays the signal T at the input by an amount substantially equal to $T_o/4$. The delayed signal $T'$ appearing at the output 46 of delay circuit 45 is applied to one input of a second correlator 47, which is suitably identical to the first correlator 42. The second correlator 47 is also connected to receive the sum U, and its output is applied with the signal $T'$ to respective inputs of a second multiplier 48.

This second multiplier 48 delivers at its output 49 the product $T' \overline{UT'}$ $$T' = T(t - (t_o/4))$$

The instantaneous value of $T'$ is $$-h''V(t - (T_o/4))$$

An adder 50 is connected to receive on respective inputs the signals $T \cdot \overline{UT}$ and $\overline{T'UT'}$, and provides at its output 50 their sum P.

A subtractor 52 is connected to receive on respective inputs this sum P and the sum U. At its output it provides the corrected signal $S_o$.

Referring now to FIG. 2, the apparatus may be simplified where the respective powers $B_1$ and $B_2$ of noise levels $b_1$ and $b_2$ are equal. In this case, the coefficient $h'$ is zero and elements 42, 43 and 50 of FIG. 1 are no longer required. The output of multiplier 48 is connected directly to one input of subtractor 52 whose other input is connected to the output 34 of adder 32. As in the case of FIG. 1, the improved signal $S_o$ is obtained at the output 53 of subtractor 52.

Various modifications may be made to the circuits of FIGS. 1 and 2. For example, the delay circuit 45 may be arranged to provide a delay $3T_o/4$ instead of $T_o/4$. This has the effect of inverting the polarity of signal $T'$, but does not change the value of the signal received at the output 49 of the second multiplier 48. With this modification, the circuits of FIGS. 1 and 2 operate as described.

The invention has been described with reference to a system in which two aerials each pick up a useful signal subject to noise. In this case, the apparatus described provides at its output an improved signal in which the signal-to-noise ratio is reduced.

The apparatus as described has wider application, however. For example, if it is supposed that point 34 is the output of a first transducer or the like providing a signal subject to noise, and that point 35 is the output of a second system providing the noise alone, then points 34 and 35 may be considered as the input terminals of a device improving the signal-to-noise ratio.

Such an application would occur, for example, when a measuring system mounted on a mobile structure received a signal affected by a noise source on the same structure. In this case, an independent system could be used to provide a signal depending only on the noise, the noise-affected signal being applied to point 34 and the noise signal alone to point 35. The apparatus described would then provide at its output 53 a signal in which the noise content was reduced.

Equation (6) shows that where there is a total correlation between noise levels $b_1$ and $b_2$, that is to say when they differ only in amplitude in phase, whilst having the same waveform, the output noise level may be reduced to zero. This situation may occur, for example, when the two noise levels are due to a common noise source.

We claim:

1. In a receiving system for noise-affected communication signals transmitted in a narrow frequency band centered on a given frequency $f_o$, two wave collectors receiving said signals, amplifying and filtering means processing signals taken from one and the other of said wave collectors and respectively delivering them in the form of two filtered signals to one and the other of two input terminals of a noise reducing circuit, said filtered signals consisting of amplitude-and-phase identical communication signals and noise components superposed thereon; addition and subtraction means fed from said input terminals and delivering the sum and the difference of said filtered signals; amplitude-regulating means fed at their input from said signal difference and delivering at their output an amplitude-regulated difference signal having a predetermined constant root-mean-square value; and means for processing said amplitude-regulated signal and for subtractively combining the so processed signal with said sum of filtered signals, whereby there is obtained a new signal, the signal-to-noise power ratio of which is improved relatively to that of said noise-affected communication signals.

2. In a receiving system for nois-affected communication signals transmitted in a narrow frequency band centered on a given frequency $f_o$, two wave collectors receiving said signals, amplifying and filtering means processing signals taken from one and the other of said wave collectors and respectively delivering them in the form of two filtered signals to one and the other of two input terminals of a noise reducing circuit, said filtered signals consisting of amplitude-and-phase identical communication signals and noise components superposed thereon; addition and subtraction means fed from said input terminals and delivering the sum and the difference of said filtered signals; amplitude-regulating means fed at their input from said signal difference and delivering at their output an amplitude-regulated difference signal having a predetermined constant root-mean square value, a first correlator means having two inputs respectively fed from said signal sum and amplitued-regulated difference signal and delivering at its output an averaged signal proportional to the time average of the product of said signal sum and amplitued-regulated difference signal; a delay network fed from said amplitude-regulated difference signal and delivering a delayed amplitude-regualted difference signal; a second correlator means having two inputs respectively fed from said signal sum and said delayed amplitude-regulated difference signal and delivering at its output an averaged signal proportional to the time average of the product of said signal sum and said delayed amplitude-regulated difference signal; a first multiplier having an input fed from said amplitude-regulated difference signal and another input fed from the output of said first correlator means and delivering at its output the product of said averaged signal by said amplitude-regulated difference signal; a second multiplier having an input fed from said delayed amplitude regulated difference signal and another input fed said averaged signal from said second correlator means and delivering at its output the product of the latter said difference and averaged signals; an adder circuit having two inputs respectively fed from the outputs of said first and second multipliers, and a subtractor circuit having an input fed from the output of said adder circuit and another input fed said signal sum from said addition means, said adder circuit delivering at its output an improved signal to-noise power ratio relatively to that of said noise-affected communication signals.

3. In a receiving system as claimed in claim 2, the arrangement in which said filtering means consist of a narrow-pass band filter having its pass band centered on frequency $f_o$.

4. In a receiving system as claimed in claim 2, the arrangement in which said amplitude-regulating means consist of an amplifier provided with a gain control circuit fed from the output of said amplifier.

5. In a receiving system as claimed in claim 2, the arrangement in which said amplitude-regulating means consist of a limiter followed by a narrow-band band pass filter.

6. In a receiving system for noise-affected communication signals transmitted in a narrow frequency band centered on a given frequency $f_o$, two wave collectors receiving said signals, amplifying and filtering means processing signals taken from one and the other of said wave collectors and respectively delivering them in the form of two filtered signals to one and the other of two input terminals of a noise reducing circuit, said filtered signals consisting of amplitude-and-phase identical communication signals and noise components superposed thereon; addition and subtraction means fed from said input terminals and delivering the sum and the difference of said filtered signals; amplitude-regulating means fed at their input from said signal difference and delivering at their output an amplitued-regulated difference signal having a predetermined constant root-mean-square value; a delay network fed from said amplitude-regulated difference signal and delivering a delayed amplitude-regulated difference signal; correlator means having two inputs respectively fed from said signal sum and said delayed amplitude-regulated difference signal and delivering at its output an averaged signal proportional to the time average of the product of said signal sum and said delayed amplitude-regulated difference signal; a multiplier having an input fed from said delayed amplitude-regulated difference signal and another input fed from said averaged signal and delivering at its output the product of the latter said difference and averaged signals; and a subtractor circuit having an input fed from the output of said multiplier and another input fed said signal sum from said addition means, said subtractor circuit delivering at its output an improved signal having an improved signal-to-noise power ratio relatively to that of said noise-affected communication signals.

7. In a receiving system as claimed in claim 6, the arrangement in which said filtering means consists of a narrow-pass band filter having its pass band centered on frequency $f_o$.

8. In a receiving system as claimed in claim 6, the arrangement in which said amplitude-regulating means consists of an amplifier provided with a gain control circuit fed from the output of said amplifier.

9. In a receiving system as claimed in claim 6, the arrangement in which said amplitude-regulating means consist of a limiter followed by a narrow-band band pass filter.

* * * * *